(No Model.)
C. C. TYLER.
MACHINE FOR MAKING MILLING CUTTERS.
No. 435,574. Patented Sept. 2, 1890.
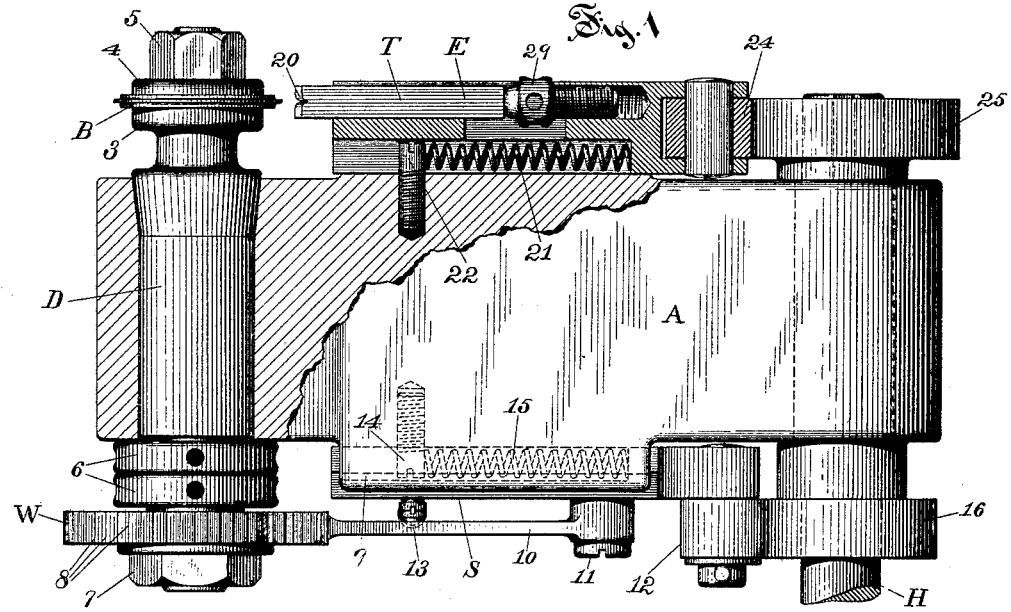
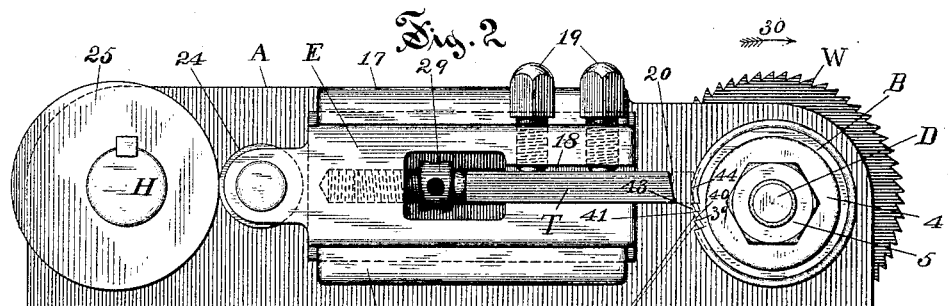
Witnesses:
W. M. Bjorkman
Henry L. Rickard
Inventor
Charles C. Tyler,
By his Attorney:
F. H. Richards

UNITED STATES PATENT OFFICE.

CHARLES C. TYLER, OF CHESHIRE, CONNECTICUT.

MACHINE FOR MAKING MILLING-CUTTERS.

SPECIFICATION forming part of Letters Patent No. 435,574, dated September 2, 1890.

Application filed March 23, 1889. Renewed February 11, 1890. Serial No. 339,994. (No model.)

*To all whom it may concern:*

Be it known that I, CHARLES C. TYLER, a citizen of the United States, residing at Cheshire, in the county of New Haven and State of Connecticut, have invented certain new and useful Improvements in Machines for Making Milling-Cutters, of which the following is a specification.

This invention relates to machines for making milling-cutters adapted to be used for the cutting of gears and pinions, the object being to furnish a machine for making such a cutter with precision and economy by the method described and claimed in my application, Serial No. 291,137.

In the drawings accompanying and forming a part of this specification, Figure 1 is a plan view, partially in section, of a machine embodying my invention. Fig. 2 is an elevation of the front side of the same. Fig. 3 is a rear elevation. Fig. 4 is a detail, drawn on an enlarged scale, illustrative of the operation of the machine.

Similar characters designate like parts in all the figures.

For the manufacture of milling-cutters by means of my improved machine, I form the teeth by a compressing-tool T, after the method or process described and claimed in my said prior application, and use an oversize blank B, only approximately shaped, and reduce the same to the required size simultaneously with and by the forming of the teeth on said blank. By this means, when making small cutters, (for which my said improvement is more particularly adapted,) the blanks may be first cut out by means of cutting-dies from sheet metal of suitable quality and afterward cut or "toothed" without any other intermediate preparation than forming therein the usual central hole for the cutter-carrying arbor. Consequently by the said method and process, by my improved machine I am able to produce the milling-cutters of a high quality and precision at a very low cost and of a very uniform size and shape.

The instrumentality by means of which I ordinarily practice my invention consists of a tooth-forming compressor-tool T, having on its working-face 20 a conformation coinciding with the form of tooth to be made, as illustrated in Figs. 1, 2, and 4. This tool, when making circular cutters of a required size, is limited in its working-stroke to stop at a certain precise distance from the center of the cutter. The blank B is carried on an arbor D, which is carried in a closely-fitted bearing in the bed or frame A. Said blank is or may be affixed to its arbor by the tight and loose flanges 3 4, respectively, and the nut 5.

The arbor D is held in place by collars 6 or otherwise, and is revolved intermittingly by a suitable feed mechanism, substantially as follows: A ratchet-wheel W is fixed on said arbor by a nut 7 or otherwise and has a series of teeth 8 corresponding to the teeth to be made on the cutter-blank B. A feed-slide S, carried in ways 9 on one side of bed A, carries a feed-pawl 10, which is pivoted thereto at 11, and is held normally in contact with said teeth 8 by a spring 13. Said slide S is usually furnished with an ordinary anti-friction roller 12, bearing against the feed-cam 16 on the driving-shaft H. A spring 15 (shown in dotted lines in Fig. 1) is laid in a recess in the slide S and reacts against the stop 14 to drive said slide toward shaft H and keep the roller 12 in contact with cam 16.

The tooth-forming tool T is carried by a slide E, which moves in ways 17 on the forward side of the bed-plate A. The tool is placed in a slot or channel 18 under the set-screws 19, and forward of the adjusting-screw 29, whereby said tool may be forced out toward the blank B (see Figs. 1 and 2) to obtain the required adjustment for properly forming cutting-teeth on said blank. A spring 21 (similar to spring 15) reacts against the pin or stop 22 to retract the slide E and to hold the anti-friction roller 24, with which said slide is or may be provided, against the compressing-cam 25 that is fixed on shaft H. This cam 25 imparts a reciprocating or advancing and retracting movement to the reciprocating tooth-forming tool T, and while the slide E is retracted the cam 16 feeds forward the arbor D, and blank thereon, ready for the next tooth-forming operation. It will be noticed that the bevel or inclination of the face 20 is such that it tends, on entering the metal of blank D, to turn the arbor in the direction of arrow 30. To overcome that tendency and insure accurate results, one portion 32 of the cam 16 is made circular, to serve as a stop to prevent any retrograde movement of the pawl 10 or wheel W during the tooth-forming operation. For this purpose said cam 16 is set in such relation, substantially as shown, to cam 25 that the wheel W is fully fed forward toward the point of the tool T before said tool comes against the blank, and so that said portion 32 stands against the roller 12 throughout the whole duration of the action of said tool on said blank. Said tool is further described and claimed in a separate application by me filed, Serial No. 325,681.

The collars 3 and 4 form side dies or gages, limiting the displacement of the metal radially to the axis of the cutter, and co-operate with the tool T to force the surplus metal in a forward direction, and thus avoid any displacement of the preceding tooth. To properly effect this important result, I find it advisable to construct the said collars or dies of such diameter as to approach the bottom line 39 by a distance not greater or less than the thickness of said blank; but this feature is more important when working some kinds of steel and with some sizes or shapes of cutters than with other kinds and sizes. In Fig. 4 the darker shading at 48 illustrates the condensation of the metal between the tool T and said flanges, and shows how the main portion of the blank or plate B is protected by said flanges from distortion.

The operation of forming a tooth consists in the compression of the blank (which may be unheated and in its natural condition) by a suitable instrumentality—as, for instance, tool T—in a direction crosswise to the line of the points of the cutting-teeth and at such an angle thereto as is proper to form the required relief or "backing off" for the tooth by a movement of the said tool in a direction parallel to the cutting-face of the tooth formed by said movement. This having been done once, the blank is advanced (relative to such instrumentality) and another compression similarly effected, as indicated by dotted lines in Fig. 2. The final compression extends on the line 45 from the root 39 of the tooth 40 upward and forward to the intersection 41 with the line 43 of the points of the cutting-teeth, and beyond point 41 to the periphery 44 of the blank. The blank is now advanced through the arc (or space) from point 39 to point 44, Fig. 2, and the operation repeated. It will thus be seen that the true size of the cutter is a line extending through the points 41 of the cutting-teeth, and that the position of these points is determined by the angle of said line 45 and by the distance through which the blank is advanced between the successive compressions.

Having thus described my invention, I claim—

1. In a machine for making milling-cutters, the combination, with the blank-carrying arbor, of the reciprocating tooth-forming compressing-tool, having its movement in directions toward and from the blank on said arbor and parallel to the cutting-face of the tooth-forming tool, and means, substantially as described, for advancing and retracting said tool and intermittingly revolving said arbor while the tool is retracted, all substantially as described.

2. In a machine for making milling-cutters, the combination, with the blank-carrying arbor, of the reciprocating tooth-forming compressing-tool, having its movement in directions toward and from the blank on said arbor and parallel to the cutting-face of the tooth-forming tool, the slide carrying said tool, the cam actuating said slide, and means for intermittingly revolving the arbor while the tool and slide are retracted, substantially as described.

3. In a machine for making milling-cutters, the combination, with the blank-carrying arbor, of the reciprocating tooth-forming compressing-tool having its movement in directions toward and from the blank on said bor, and means, substantially as described, for intermittingly revolving the arbor while the tool is retracted, the face of said tool being inclined to its line of movement and the arbor being revolved in the direction toward the cutting-point of said tool, all substantially as described.

4. In a machine for making milling-cutters, the combination, with the blank-carrying arbor, of the reciprocating tooth-forming compressing-tool, the slide carrying said tool, means for advancing and retracting said slide and tool, the ratchet-wheel, the pawl, and the cam 16, having the circular part 32, the arbor being revolved in a direction toward the point of the tool, and the circular part 32 serving as a stop to prevent retrograde movement of the arbor during the tooth-forming operation, all substantially as described.

5. In a machine for making milling-cutters, the combination, with the arbor having the gage-flanges, of the reciprocating compressing-tool having the inclined tooth-forming face, and means for intermittingly revolving said arbor, substantially as described.

6. In a machine for making milling-cutters, the combination, with the bed-plate and the blank-carrying arbor, of the slide E, the compressing-tool T, adjustably fixed to said slide, the cam 25 advancing, and a spring retracting said slide, substantially as described.

7. In a machine for making milling-cutters, the combination, with the bed-plate, of the arbor D, having ratchet-wheel W, the slide E, carrying tool T, slide S, carrying a pawl actuating said wheel, the driving-shaft, a cam-actuating slide E, and a cam-actuating slide S to feed the wheel while the slide E is retracted, all substantially as described.

CHARLES C. TYLER.

Witnesses:
GEORGE W. KEELER,
E. S. CORNWALL.